(12) United States Patent
Bush et al.

(10) Patent No.: US 11,937,056 B2
(45) Date of Patent: Mar. 19, 2024

(54) MULTI-TALKER SEPARATION USING 3-TUPLE COPRIME MICROPHONE ARRAY

(71) Applicants: Dane Bush, Mountain View, CA (US); Ning Xiang, Cohoes, NY (US)

(72) Inventors: Dane Bush, Mountain View, CA (US); Ning Xiang, Cohoes, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 207 days.

(21) Appl. No.: 17/636,525

(22) PCT Filed: Aug. 24, 2020

(86) PCT No.: PCT/US2020/047566
§ 371 (c)(1),
(2) Date: Feb. 18, 2022

(87) PCT Pub. No.: WO2021/035201
PCT Pub. Date: Feb. 25, 2021

(65) Prior Publication Data
US 2022/0272446 A1     Aug. 25, 2022

Related U.S. Application Data

(60) Provisional application No. 62/890,130, filed on Aug. 22, 2019.

(51) Int. Cl.
*H04R 3/00*    (2006.01)
*G10L 21/028*  (2013.01)
*H04R 1/40*    (2006.01)

(52) U.S. Cl.
CPC .......... *H04R 3/005* (2013.01); *G10L 21/028* (2013.01); *H04R 1/406* (2013.01); *H04R 2201/401* (2013.01)

(58) Field of Classification Search
CPC .......... H04R 3/005; H04R 1/406; H04R 1/20; H04R 1/222; H04R 1/40; H04R 2201/401; H04R 25/407; G10L 21/028
(Continued)

(56) References Cited

U.S. PATENT DOCUMENTS

| 11,523,212 B2 * | 12/2022 | Ansai | H04R 19/04 |
| 2002/0009203 A1 * | 1/2002 | Erten | H04R 1/406 |
| | | | 381/94.1 |

(Continued)

FOREIGN PATENT DOCUMENTS

CN    110133595 A  *  8/2019    ............... G01S 5/20

OTHER PUBLICATIONS

International Search Report and The Written Opinion of the International Searching Authority, International Application No. PCT/US2020/047566, dated Dec. 18, 2020.

(Continued)

*Primary Examiner* — Ahmad F. Matar
*Assistant Examiner* — Sabrina Diaz
(74) *Attorney, Agent, or Firm* — Murtha Cullina LLP; Anthony P. Gangemi (57) ABSTRACT

A method of multi-talker separation using a 3-tuple coprime microphone array, including generating, by a subarray signal processing module, a respective subarray data set for each microphone subarray of the 3-tuple coprime microphone array based, at least in part, on an input acoustic signal comprising at least one speech signal. The input acoustic signal is captured by the 3-tuple coprime microphone array. The 3-tuple coprime microphone array includes three microphone subarrays. The method includes determining, by the subarray signal processing module, a point by point product of the three subarray data sets; and determining, by the subarray signal processing module, a cube root of the point (Continued)

by point product to yield an acoustic signal output data. The acoustic signal output data has an output amplitude and an output phase corresponding to an input amplitude and an input phase of a selected speech signal of the at least one speech signal.

20 Claims, 3 Drawing Sheets

(58) Field of Classification Search
USPC .......................................... 381/92, 111, 122
See application file for complete search history.

(56) References Cited

U.S. PATENT DOCUMENTS

| | | | |
|---|---|---|---|
| 2004/0037168 | A1 | 2/2004 | Smith et al. |
| 2006/0153059 | A1 | 7/2006 | Spence et al. |
| 2010/0251877 | A1 | 10/2010 | Jochelson et al. |
| 2012/0051548 | A1 | 3/2012 | Visser et al. |
| 2013/0029684 | A1* | 1/2013 | Kawaguchi ............ H04R 3/005 455/456.1 |
| 2013/0259254 | A1 | 10/2013 | Xiang et al. |
| 2017/0307755 | A1 | 10/2017 | Brooks |
| 2018/0109873 | A1 | 4/2018 | Xiang et al. |
| 2019/0058944 | A1* | 2/2019 | Gunawan ............... H04R 3/005 |

OTHER PUBLICATIONS

Bush, D., "Acoustic And Bayesian Analyses Of N-Tuple Coprime Arrays," ProQuest, Dec. 2018.

* cited by examiner

MULTI-TALKER SEPARATION USING 3-TUPLE COPRIME MICROPHONE ARRAY

CROSS REFERENCE TO RELATED APPLICATION(S)

This application claims the benefit of U.S. Provisional Application No. 62/890,130, filed Aug. 22, 2019, which is incorporated by reference as if disclosed herein in its entirety.

FIELD

The present disclosure relates to multi-talker separation, in particular to, multi-talker separation using a 3-tuple coprime microphone array.

BACKGROUND

Microphone arrays may be used in a variety of acoustic applications, including, but not limited to, passive-sonar localization, spatial-audio recording, and isolation of a particular signal from noise. For example, acoustic source localization based on microphone array signal processing may be used to aid in locating a source of gunfire. Such acoustic applications may rely on beamforming characteristics of a given microphone array. Relatively narrow beam widths may facilitate capturing an acoustic signal from a particular sound source in the presence of noise and/or other sound sources.

SUMMARY

In some embodiments, there is provided a method of multi-talker separation using a 3-tuple coprime microphone array. The method includes generating, by a subarray signal processing module, a respective subarray data set for each microphone subarray of the 3-tuple coprime microphone array based, at least in part, on an input acoustic signal including at least one speech signal. The input acoustic signal is captured by the 3-tuple coprime microphone array. The 3-tuple coprime microphone array includes three microphone subarrays. The method further includes determining, by the subarray signal processing module, a point by point product of the three subarray data sets; and determining, by the subarray signal processing module, a cube root of the point by point product to yield an acoustic signal output data. The acoustic signal output data has an output amplitude and an output phase corresponding to an input amplitude and an input phase of a selected speech signal of the at least one speech signal. In some embodiments, the method may further include.

In some embodiments, the method further includes selecting, by the subarray signal processing module, a selected listening direction. The selected listening direction corresponds to the selected speech signal. The input acoustic signal includes a plurality of speech signals. A respective source of each speech signal is positioned at a respective listening direction.

In some embodiments of the method, the generating the respective subarray data sets includes point by point summation.

In some embodiments, the method further includes recovering, by a sound source separation module, the selected speech signal.

In some embodiments, the method further includes beam steering the 3-tuple coprime microphone array to a listening direction associated with the selected speech signal.

In some embodiments of the method, the beam steering includes adjusting an orientation of the 3-tuple coprime microphone array.

In some embodiments of the method, the beam steering includes performing a delay and sum operation.

In some embodiments, there is provided a computer readable storage device. The device has stored thereon instructions that when executed by one or more processors result in the following operations including: generating a respective subarray data set for each microphone subarray of a 3-tuple coprime microphone array based, at least in part, on an input acoustic signal including at least one speech signal. The input acoustic signal is captured by the 3-tuple coprime microphone array and the 3-tuple coprime microphone array includes three microphone subarrays. The operations further include determining a point by point product of the three subarray data sets; and determining a cube root of the point by point product to yield an acoustic signal output data. The acoustic signal output data has an output amplitude and an output phase corresponding to an input amplitude and an input phase of a selected speech signal of the at least one speech signal.

In some embodiments, the instructions that when executed by one or more processors result in the following additional operations including selecting a selected listening direction. The selected listening direction corresponds to the selected speech signal. The input acoustic signal includes a plurality of speech signals. A respective source of each speech signal is positioned at a respective listening direction.

In some embodiments of the computer readable storage device, the generating the respective subarray data sets includes point by point summation.

In some embodiments, the instructions that when executed by one or more processors result in the following additional operations including recovering the selected speech signal.

In some embodiments, the instructions that when executed by one or more processors result in the following additional operations including beam steering the 3-tuple coprime microphone array to a listening direction associated with the selected speech signal.

In some embodiments of the computer readable storage device, the beam steering includes performing a delay and sum operation.

In an embodiment, there is provided system for multi-talker separation. The system includes a computing device. The computing device includes a subarray signal processing module configured to generate a respective subarray data set for each microphone subarray of a 3-tuple coprime microphone array based, at least in part, on an input acoustic signal including at least one speech signal. The input acoustic signal is captured by the 3-tuple coprime microphone array and the 3-tuple coprime microphone array includes three microphone subarrays. The subarray signal processing module is further configured to determine a point by point product of the three subarray data sets. The subarray signal processing module is further configured to determine a cube root of the point by point product to yield an acoustic signal output data. The acoustic signal output data has an output amplitude and an output phase corresponding to an input amplitude and an input phase of a selected speech signal of the at least one speech signal.

In some embodiments of the system, the subarray signal processing module is configured to select a selected listening direction. The selected listening direction corresponds to the selected speech signal. The input acoustic signal includes a plurality of speech signals. A respective source of each speech signal is positioned at a respective listening direction.

In some embodiments of the system, the subarray signal processing module is configured to generate the respective subarray data sets using point by point summation.

In some embodiments of the system, the computing device further includes a sound source separation module configured to recover the selected speech signal.

In some embodiments, the system includes beam steering the 3-tuple coprime microphone array to a listening direction associated with the selected speech signal.

In some embodiments of the system, the beam steering includes adjusting an orientation of the 3-tuple coprime microphone array.

In some embodiments of the system, the beam steering includes performing a delay and sum operation.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Microphone arrays with a variety of geometries may be used for a variety of tasks including traffic noise analysis, sound field reconstruction, and sound source localization and separation. Generally, increasing a number of microphones in a microphone array may reduce a corresponding beam width of the microphone array but at an increased cost and with relatively more complex acoustic signal processing. Sparse and nonuniform array geometries may be configured to provide a similar performance using fewer elements (microphones) compared to, for example, uniform linear microphone arrays. For example, a coprime sensor array (CSA) may include a plurality of uniform linear subarrays, with each linear subarray including a respective sparse number of array elements, i.e., microphones. The respective number of array elements are configured to be coprime, as will be described in more detail below.

In some embodiments, a coprime microphone array may be configured for broadband beamforming. "Beamforming" relates to spatially filtering a signal, e.g., a sound signal. Spatial filtering may facilitate "listening" to a selected direction and suppressing acoustic information from other directions. A spatial filter direction may thus be referred to as a beam and a directional pattern of this "listening" direction may be described as a beam pattern.

Coprime arrays may provide useful results at frequencies lower than a design frequency that corresponds to a length and coprime factors of a CSA. For example, a CSA with two subarrays of M and N respective sensors may replicate a beam pattern of a uniform linear array (ULA) of M*N sensors. In another example, a triple (i.e., 3-tuple) coprime array that includes three subarrays with M, N, and O respective sensors may replicate a ULA with M*N*O sensors. A CSA that includes a number, n, subarrays may be referred to herein as an n-tuple coprime sensor array. An n-tuple coprime array may thus include n uniform linear subarrays.

One uniform linear array (ULA) with M sensors has a far-field beam pattern that may be described as:

$$H(\alpha(\theta, \lambda)) = \sum_{m=0}^{M-1} h(m)e^{-j\alpha m} \quad (1)$$

where $\alpha=(2d/\lambda)\,\pi\,\sin\theta$, m corresponds to individual sensor index, $\lambda$ is wavelength, $j=\sqrt{-1}$, h(m) is a magnitude or a weighting of the sensor m, and d is corresponds to inter-element separation, thus, d=L/M, where L corresponds to length of the ULA. The range of $\theta$ may constrained to the range $-\pi/2 \leq \theta \leq \pi/2$ to accommodate front-back ambiguities in the linear array. Thus, $\alpha$ may be in the range $-\pi \leq \alpha \leq \pi$, providing a lower-limit wavelength of $2d \leq \lambda$, corresponding to an upper-limit frequency of $$f_{ULA} = \frac{cM}{2L} \quad (2)$$

where c is wave speed in the medium.

Operating such a ULA at higher frequencies may introduce aliasing in the form of grating lobes that are copies of the original beam pattern. At an integer, N, times the limit frequency, $f_{ULA}$, a sound source observed by the ULA may appear in N places in the array response. It may be appreciated that the sound source is undersampled by a factor of N. The aliased beam pattern may then be described as:

$$H(z) = \sum_{m=0}^{M-1} h(m)z^{-Nm} \quad (3)$$

where the substitution $z=e^{(j\alpha)}$ has been made. If another ULA with different inter-element spacing observes the same sound source at the same frequency, but with different grating lobe positions, the actual direction of the sound source can be estimated based, at least in part, on which lobes are shared between the two ULA subarrays. The grating lobes of each subarray are configured to be aliased by factors which are coprime (sometimes also referred to as mutually prime) to avoid having the grating lobes coincide in more than one direction.

Coprime numbers are integers that do not share any common divisors other than 1. In other words, coprime numbers do not share any prime factors with one another. It may be appreciated that sets of pairwise coprime numbers can may include two or more integers. Thus, an n-tuple coprime sensor array may include a number n uniform linear subarrays, each spatially undersampled by pairwise coprime factors. For example, a triple coprime array may rely on a set of 3 integers (M, N, O), where M, N, and O are pairwise coprime. These integers may then correspond to the respective numbers of elements in each subarray. The undersampling factor for each subarray may then be determined based, at least in part, on a product of the remaining coprime integers, resulting in the following subarray beampatterns:

$$H_M(z) = \sum_{m=0}^{M-1} h_M(m)z^{-NOm} \quad (4A)$$

$$H_N(z) = \sum_{n=0}^{N-1} h_N(n)z^{-MOn} \quad (4B)$$

$$H_O(z) = \sum_{o=0}^{O-1} h_O(o)z^{-MNo} \quad (4C)$$

The subarray inter-element spacings may then correspond to $d_M = NO\ \lambda/2$, $d_N = MO\ \lambda/2$, and $d_O = MN\ \lambda/2$, where the subscripts M, N, and O correspond to the respective subarrays. The triple coprime design frequency for the 3-tuple coprime array may then correspond to:

$$f_c = \frac{cMNO}{2L} \quad (5)$$

where L is the shared length of all subarrays. It may be appreciated that the 3-tuple coprime microphone array may result in a design frequency that is a factor of O higher than a highest frequency observed by a corresponding dual coprime array (i.e. having two subarrays with M and N elements, respectively).

Generally, this disclosure relates to multi-talker separation using a 3-tuple coprime microphone array. Coprime beamforming of a 3-tuple coprime microphone array may be implemented by a multiplication (i.e., determining a product) of the 3 subarray output signals. The 3 subarray output signals may thus be collectively beamformed in a direction of a selected acoustic signal. For example, beamforming may be accomplished with delay-and-sum operations. However, this disclosure is not limited in this regard.

The received acoustic signal may have a finite (possibly broad) frequency range. The multiplication of resulting subarray beamformed signals (i.e., subarray output signals) in the time domain may result in a relatively sharp (i.e., narrow) beam. Thus, the 3-tuple coprime microphone array and beamforming operations may result in a directional filtering. It may be appreciated that multiplication of the subarray output signals may result in distortion of the received acoustic speech signals. Since threefold-multiplications are conducted for the direction to be focused using a triple coprime array, a cube-root operation ($\sqrt[3]{\ }$) may facilitate recovery of the speech signals. It may be appreciated that the phase information may be recovered from a cube-root operation. For example, in polar coordinates, the cube root operation may yield a principal cube root with a magnitude that is a cube root of the magnitude of the threefold multiplication result and a phase that is one third the phase of the threefold multiplication result.

Thus, speech source separation using a triple (3-tuple) coprime microphone array may be performed using relatively simple techniques, e.g., point by point summing, multiplication and cube root. When implemented computationally, speech source separation using a 3-tuple coprime microphone array is configured to have a relatively inexpensive computational load.

Figure 1:
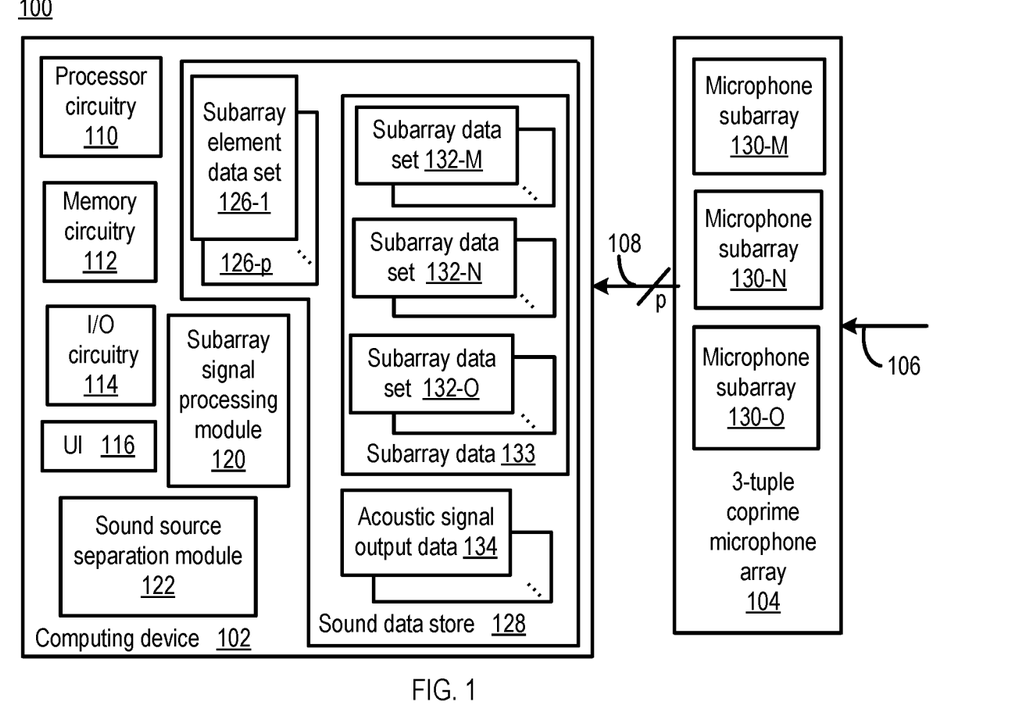
FIG. 1 illustrates a functional block diagram of a multi-talker separation system consistent with several embodiments of the present disclosure.

FIG. 1 illustrates a functional block diagram of a multi-talker separation system 100 consistent with several embodiments of the present disclosure. System 100 includes a computing device 102 and a 3-tuple coprime microphone array 104. 3-tuple coprime microphone array 104 is configured to capture an input acoustic signal 106 and to generate one or more corresponding electrical signals based, at least in part, on the captured acoustic signal. The acoustic signal 106 may include contributions from a plurality of acoustic sources. For example, the acoustic signal 106 may include speech elements from one or more "talkers". A talker is thus one example of an acoustic source and a corresponding acoustic signal may include speech.

Computing device 102 may include, but is not limited to, a microcomputer, a portable computer, a desktop computer, a tablet computer, a laptop computer, etc. Computing device 102 includes a processor circuitry 110, a memory circuitry 112, an input/output (I/O) circuitry 114 and a user interface (UI) 116. Computing device 102 may include a subarray signal processing module 120, a sound source separation module 122, and a sound data store 128.

Processor circuitry 110 may include, but is not limited to, a single core processing unit, a multicore processor, a graphics processing unit, etc. Processor circuitry 110 is configured to perform operations of computing device 102, including, for example, operations of the subarray signal processing module 120 and the sound source separation module 122. Memory circuitry 112 may be configured to store data and/or configuration parameters associated with subarray signal processing module 120, sound source separation module 122 and/or microphone array 104. For example, memory circuitry 112 may be configured to store the sound data store 128. I/O circuitry 114 may be configured to receive electrical signals from 3-tuple microphone array 104. UI 116 may include a user input device (e.g., keyboard, mouse, touch sensitive display, etc.) and/or a user output device, e.g., a display.

In an embodiment, the microphone array 104 is configured as a 3-tuple coprime microphone array architecture. A coprime linear microphone array allows for a relatively narrower beam with fewer microphones compared to a uniform linear microphone array. A 3-tuple coprime microphone array includes three uniform linear subarrays that are coincident (the same starting point and both continue in the same direction) with M, N and O microphones, respectively, where each pair of M, N and O are coprime with each other. By applying spatial filtering to the subarrays and combining their outputs, M+N+O−2 microphones are configured to yield M×N×O directional bands. Coprime linear microphone arrays may be configured to extend a frequency range of a given number of array elements by exceeding a spatial Nyquist limit.

3-tuple coprime microphone array 104 includes three microphone subarrays 130-M, 130-N, 130-O. Each microphone subarray may include a respective number of microphones. Thus, microphone subarray 130-M may include a number, M, microphones; microphone subarray 130-N may include a number, N, microphones; and microphone subarray 130-O may include a number, O, microphones. M, N and O are configured to be pair-wise coprime, as described herein.

Figure 2:
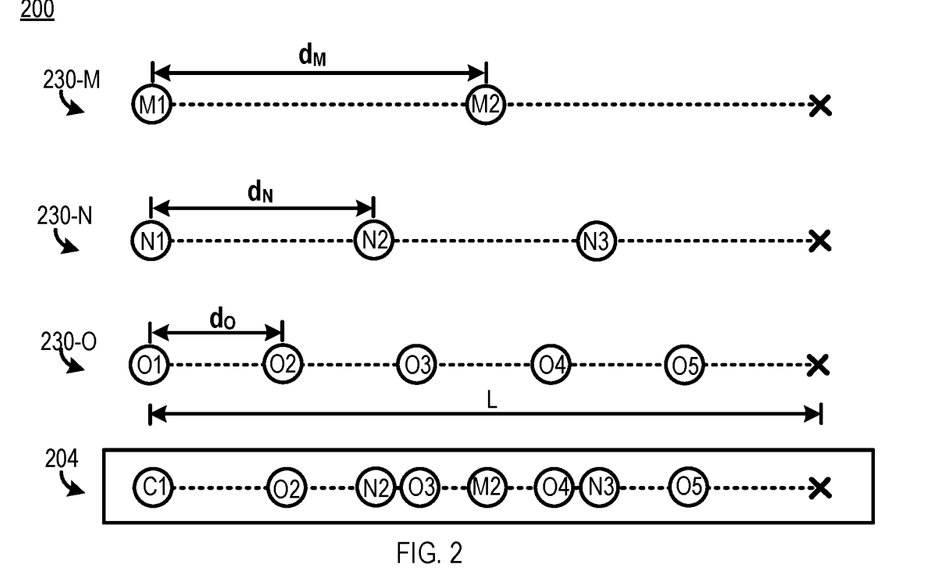
FIG. 2 illustrates one example 3-tuple coprime microphone array configuration consistent with one embodiment of the present disclosure.

FIG. 2 illustrates one example 3-tuple coprime microphone array configuration 200 consistent with one embodiment of the present disclosure. 3-tuple coprime microphone array configuration 200 includes three coprime subarrays 230-M, 230-N, 230-O and a combined 3-tuple coprime microphone array 204, all having a length, L. A first subarray 230-M includes M elements with inter-element separation $d_M$. A second subarray 230-N includes N elements with inter-element separation $d_N$. A third subarray 230-O includes O elements with inter-element separation $d_O$. A last shared element position is indicated by X. The subarray inter-element spacings may then correspond to $d_M$=NO $\lambda/2$, $d_N$=MO $\lambda/2$, and $d_O$=MN $\lambda/2$, as described herein.

In this example, M=2, N=3 and O=5. Thus, the first subarray 230-M includes elements M1 and M2; the second subarray 230-N includes elements N1, N2 and N3 and the third subarray 230-O includes elements O1, O2, . . . , O5. In the combined 3-tuple coprime microphone array 204, a first element C1 corresponds to M1, N1 and O1 of the respective subarrays, thus, the combined 3-tuple coprime microphone array 204 includes M+N+O−2 (=2+3+5−2=8) elements.

It may be appreciated that 2, 3 and 5 are pairwise coprime, i.e., 2, 3 and 5 do not share any factors other than the number one. It may be further appreciated that other 3-tuple coprime microphone arrays may include different numbers of mutually coprime elements, consistent with the present disclosure.

Figure 3A:
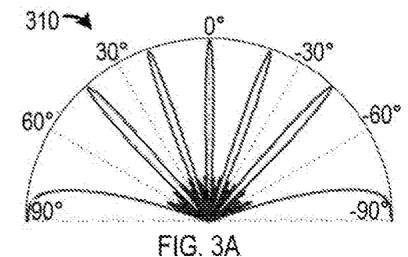
FIGS. 3A through 3D are polar plots of three subarray and corresponding 3-tuple coprime microphone array beam patterns for the example 3-tuple coprime microphone array configuration of FIG. 2.
Figure 3B:
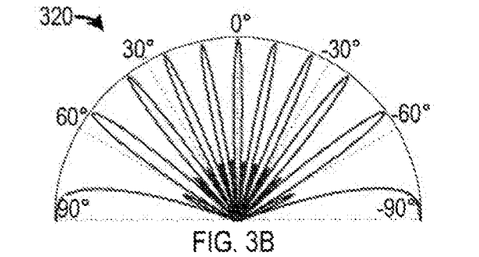
Figure 3C:
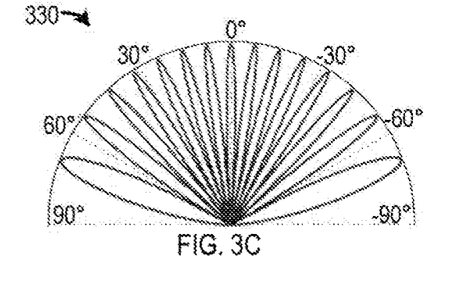
Figure 3D:
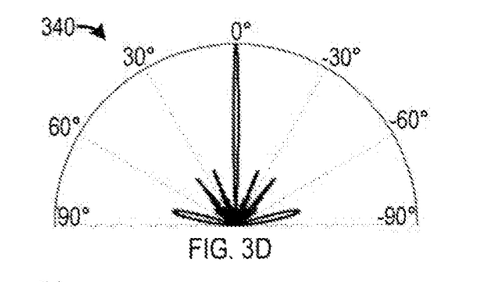

FIGS. 3A through 3D are polar plots of three subarray and corresponding 3-tuple coprime microphone array beam patterns for the example 3-tuple coprime microphone array configuration of FIG. 2. FIG. 3A illustrates a beam pattern 310 corresponding to subarray 230-M. FIG. 3B illustrates a beam pattern 320 corresponding to subarray 230-N. FIG. 3C illustrates a beam pattern 330 corresponding to subarray 230-O. FIG. 3D illustrates a beam pattern 340 corresponding to example 3-tuple coprime microphone array 204. It may be appreciated that the combination of the three subarrays provides a relatively narrow beam width. It may be further appreciated that beam steering, via, for example, delay and sum, may be implemented to steer the 3-tuple coprime microphone array beam pattern to capture a selected acoustic signal and reject noise and/or other acoustic signals.

Turning again to FIG. 1, in operation, the input acoustic signal 106 may be received by 3-tuple coprime microphone array 104, e.g., 3-tuple coprime microphone array 204. The input acoustic signal 106 may be captured by each microphone subarray 130-M, 130-N, 130-O, e.g., microphone subarrays 230-M, 230-N, 230-O. The input acoustic signal 106 may include contributions from a plurality of sound sources. For example, the input acoustic signal 106 may include speech elements from a plurality of talkers. Each of the plurality of talkers may be positioned along a respective listening direction relative to the 3-tuple coprime microphone array 104. Each listening direction may be identified via beam steering (e.g., mechanical or delay and sum). For example, the listening direction may be determined based on a received signal strength. However, this disclosure is not limited in this regard.

The subarray signal processing module 120 is configured to implement beam forming and may be configured to implement beam steering. Beam forming is configured to capture a selected acoustic signal from a sound source positioned a selected direction relative to the coprime microphone array and to attenuate (i.e., reject) noise and/or other acoustic signals. As is known, beam forming may be understood as spatial filtering. Sound source separation module 122 is configured to process output data from the subarray signal processing module 120, as will be described in more detail below.

The 3-tuple coprime microphone array 104 is configured to provide a number, p, of subarray element (i.e., microphone) output signals, collectively microphone output signals 108, to computing device 102. Each subarray element output signal corresponds to an output of a respective microphone in response to a received sound signal (e.g., input acoustic signal 106). The number of microphone output signals, p, is related to the specific 3-tuple coprime microphone array configuration and the number of subarray elements (i.e., microphones) included in the 3-tuple coprime microphone array 104. For example, for the 3-tuple coprime microphone array 204 of FIG. 2, p is equal to 8 (M+N+O−2, with M=2, N=3 and O=5). The corresponding electrical (i.e., subarray output) signals 108 may then be received by computing device 102 via I/O circuitry 114, e.g., by subarray signal processing module 120.

Subarray signal processing module 120 may be configured to sample the subarray element output signals 108 at a sample rate (i.e., at a sample time interval). Each sample may be associated with a time indicator, e.g., a sample index. A plurality of subarray element data sets 126-1, . . . , 126-$p$ corresponding to the sampled subarray element output signals may then be stored in sound data store 128. Each subarray element data set 126-1, . . . , 126-$p$ may then correspond to a respective subarray element (i.e., microphone) output signal.

A respective subset of subarray element data sets may then be combined by, e.g., subarray signal processing module 120, to generate a respective subarray data set 132-M, 132-N, 132-O. For example, for 3-tuple coprime microphone array 204 of FIG. 2, subarray data set 132-M may include contributions from microphones C1 and M2, subarray data set 132-N may include contributions from microphones C1, N2 and N3, and subarray data set 132-O may include contributions from microphones C1, O2, O3, O4, and O5.

In an embodiment, the subset of subarray element data sets associated with a selected subarray may be added, point by point, with each point corresponding to a respective time index. The point by point addition (i.e., summation processing) may be performed for each subarray 130-M, 130-N, 130-O. The summation processing output may then be stored as subarray data sets 132-M, 132-N, 132-O with each subarray data set associated with the corresponding subarray 130-M, 130-N, 130-O. The summation processing may be repeated for each of a plurality of listening directions. Each listening direction may correspond to an identified sound source, e.g., talker. Subarray data 133 may thus include a plurality of 3-tuple coprime microphone array data sets, with each 3-tuple coprime microphone array data set containing subarray data set 132-M, 132-N, 132-O associated with a respective listening direction.

In one example, the time indexes of the data sets included in the subset of subarray element data sets may be aligned, i.e., summed with no delay. In another example, the summation operations may correspond to delay and sum and may thus be configured to support beam steering. The beam steering may be configured to focus the listening direction on a selected sound source (e.g., talker) of a plurality of sound sources. It may be appreciated that, in operation, the orientation of the 3-tuple coprime microphone array 104 may be adjusted to change the direction of the beam corresponding to mechanical beam steering. Thus, beam steering may include adjusting an orientation of the 3-tuple coprime microphone array and/or performing delay and sum operations.

A point by point product (i.e., a point by point multiplication) of the subarray data sets 132-M, 132-N, 132-O included in a selected 3-tuple coprime microphone array data set may then be determined. Thus, for each listening direction, a point by point product may be determined of the corresponding subarray data sets 132-M, 132-N, 132-O. A cube root of each product may then be determined to yield a respective acoustic signal output data, e.g., acoustic signal output data 134. An amplitude and phase of the captured acoustic input signal 106 may then be preserved in each acoustic signal output data 134. The acoustic signal output data may then be stored in sound source data store 128. The sound data store 128 may then contain acoustic signal output data, e.g., acoustic signal output data 134, for each listening direction.

Figure 4A:
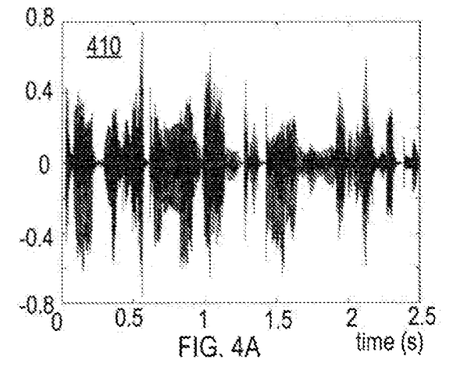
FIGS. 4A through 4D are time domain plots of acoustic signals captured by three subarrays of the example 3-tuple coprime microphone array configuration of FIG. 2 and a corresponding acoustic output signal.
Figure 4B:
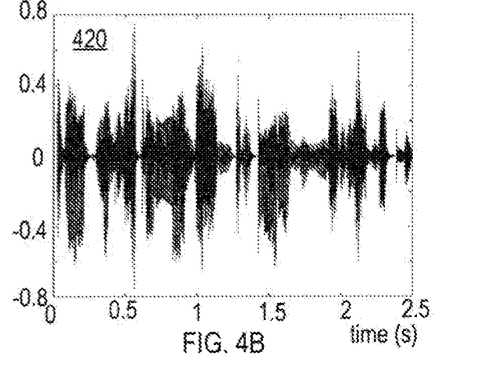
Figure 4C:
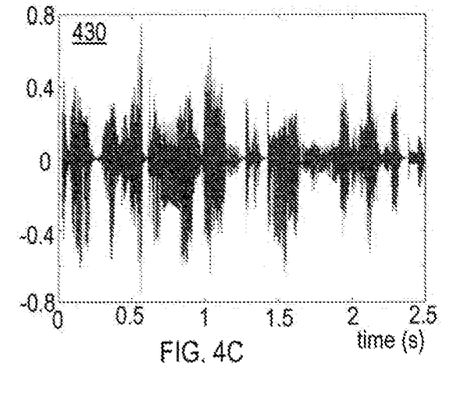
Figure 4D:
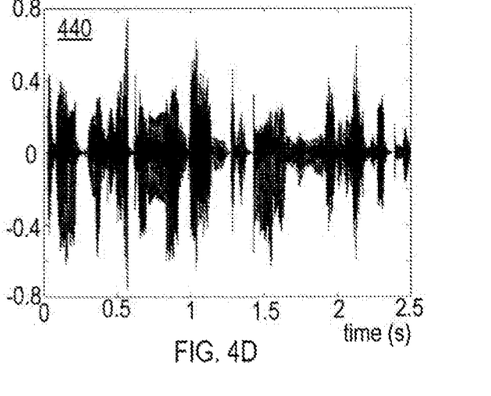

FIGS. 4A through 4D are time domain plots of acoustic signals captured by three subarrays of the example 3-tuple coprime microphone array configuration of FIG. 2 and a corresponding acoustic output signal. FIG. 4A illustrates a first acoustic signal 410 captured by subarray 230-M. FIG. 4B illustrates a second acoustic signal 420 captured by subarray 230-N. FIG. 4C illustrates a third acoustic signal 430 captured by subarray 230-O. FIG. 4D illustrates a resulting acoustic output signal 440 corresponding to a cube root of a product of sampled acoustic signals 410, 420, and 430. It may be appreciated that the resulting acoustic output signal 440 is configured to have an amplitude and phase corresponding to a selected sound source signal included the input acoustic signal 106.

Turning again to FIG. 1, each acoustic signal output data 134 may then be further processed and/or analyzed by, for example, sound source separation module 122. For example, based, at least in part, on the acoustic signal output data 134, a selected acoustic signal from a selected acoustic source may be recovered. In other words, a speech signal from a selected talker may be recovered. The selected talker may be positioned in a selected listening direction relative to the corresponding 3-tuple microphone array. The 3-tuple coprime microphone array and its associated narrow beam is configured to provide spatial filtering to capture the speech signal from the selected talker. The corresponding signal processing operations that include multiplying the subarray array data sets, and taking a cube root of the product are configured to preserve amplitude and phase of the acoustic signal. Preserving the amplitude and phase may then facilitate recovery of the speech signal produced by the selected talker.

Thus, the multi-talker separation system 100 may be configured to separate a number of sound sources (talkers) using a 3-tuple coprime microphone array.

Figure 5:
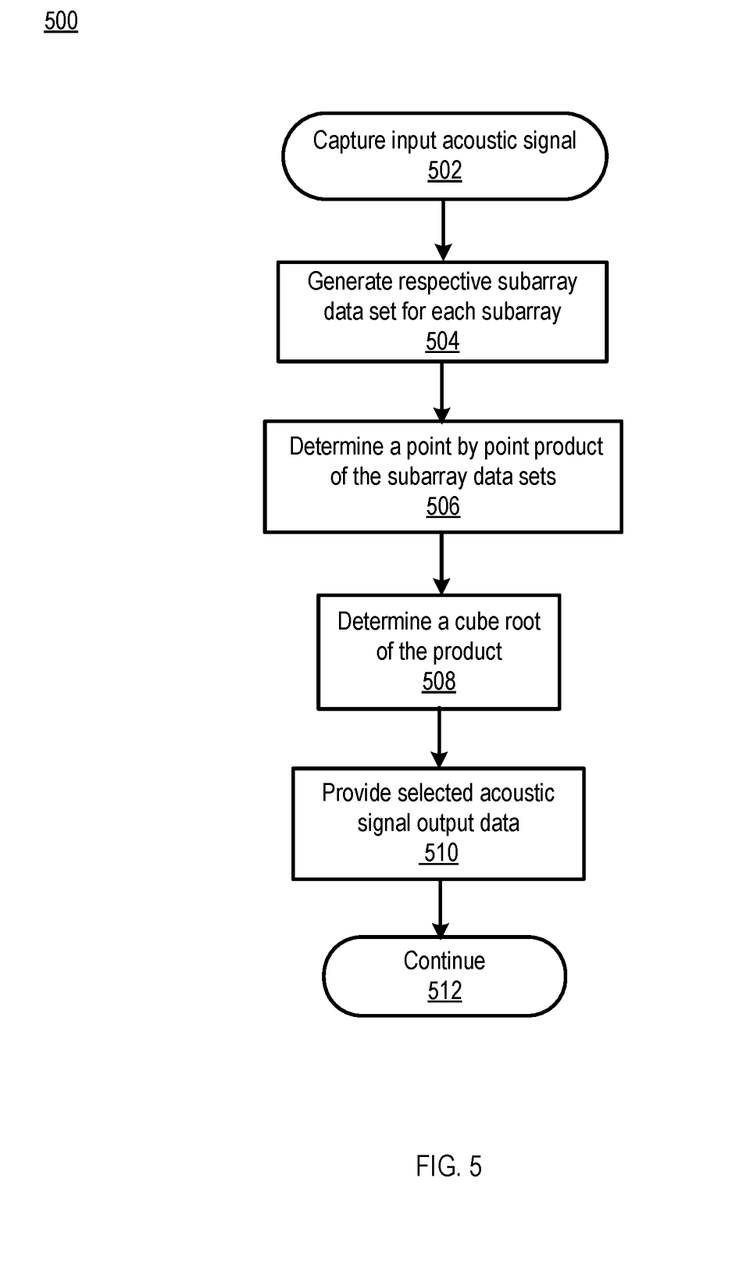
FIG. 5 is a flowchart of multi-talker separation operations consistent with several embodiments of the present disclosure.

FIG. 5 is a flowchart 500 of example multi-talker separation operations consistent with several embodiments of the present disclosure. In particular, the flowchart 500 illustrates separating a plurality of talkers using a 3-tuple coprime microphone array. The operations of flowchart 500 may be performed by, for example, computing device 102 (e.g., subarray signal processing module 120 and/or sound source separation module 122) of FIG. 1.

Operations of flowchart 500 may begin with capturing an input acoustic signal at operation 502. The input acoustic signal may include contributions from a plurality of sound sources, each located in a respective listening direction. The input acoustic signal may be captured by a 3-tuple coprime microphone array. A respective subarray data set may be generated for each subarray in the 3-tuple coprime microphone array at operation 504. A point by point product of the plurality of subarray data sets may be determined at operation 506. A cube root of the product may be determined at operation 508. A selected acoustic signal output data may then be provided at operation 510. The selected acoustic signal output data may correspond to a selected sound source, e.g., talker, positioned along a selected listening direction. Program flow may then continue at operation 512.

Thus, a number of sound sources may be separated using a 3-tuple coprime microphone array.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory circuitry 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory circuitry 112 may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of multi-talker separation using a 3-tuple coprime microphone array, the method comprising:
    generating, by a subarray signal processing module, a respective subarray data set for each microphone subarray of the 3-tuple coprime microphone array based, at least in part, on an input acoustic signal comprising at least one speech signal, the input acoustic signal captured by the 3-tuple coprime microphone array, the 3-tuple coprime microphone array comprising three microphone subarrays;
    determining, by the subarray signal processing module, a point by point product of the three subarray data sets; and
    determining, by the subarray signal processing module, a cube root of the point by point product to yield an acoustic signal output data, the acoustic signal output data having an output amplitude and an output phase corresponding to an input amplitude and an input phase of a selected speech signal of the at least one speech signal.

2. The method of claim 1, further comprising selecting, by the subarray signal processing module, a selected listening direction, the selected listening direction corresponding to the selected speech signal, the input acoustic signal comprising a plurality of speech signals, a respective source of each speech signal positioned at a respective listening direction.

3. The method of claim 1, wherein the generating the respective subarray data sets comprises point by point summation.

4. The method of claim 1, further comprising recovering, by a sound source separation module, the selected speech signal.

5. The method according to claim 1, further comprising beam steering the 3-tuple coprime microphone array to a listening direction associated with the selected speech signal.

6. The method of claim 5, wherein the beam steering comprises adjusting an orientation of the 3-tuple coprime microphone array.

7. The method of claim 5, wherein the beam steering comprises performing a delay and sum operation.

8. A computer readable storage device having stored thereon instructions that when executed by one or more processors result in the following operations comprising:
    generating a respective subarray data set for each microphone subarray of a 3-tuple coprime microphone array based, at least in part, on an input acoustic signal comprising at least one speech signal, the input acoustic signal captured by the 3-tuple coprime microphone array and the 3-tuple coprime microphone array comprising three microphone subarrays;
    determining a point by point product of the three subarray data sets; and
    determining a cube root of the point by point product to yield an acoustic signal output data, the acoustic signal output data having an output amplitude and an output phase corresponding to an input amplitude and an input phase of a selected speech signal of the at least one speech signal.

9. The device of claim 8, wherein the instructions that when executed by one or more processors result in the following additional operations comprising selecting a selected listening direction, the selected listening direction corresponding to the selected speech signal, the input acoustic signal comprising a plurality of speech signals, a respective source of each speech signal positioned at a respective listening direction.

10. The device of claim 8, wherein the generating the respective subarray data sets comprises point by point summation.

11. The device of claim 8, wherein the instructions that when executed by one or more processors result in the following additional operations comprising recovering the selected speech signal.

12. The device according to claim 8, wherein the instructions that when executed by one or more processors result in the following additional operations comprising beam steering the 3-tuple coprime microphone array to a listening direction associated with the selected speech signal.

13. The device of claim 12, wherein the beam steering comprises performing a delay and sum operation.

14. A system for multi-talker separation, the system comprising:
    a computing device comprising:
        a subarray signal processing module configured to generate a respective subarray data set for each microphone subarray of a 3-tuple coprime microphone array based, at least in part, on an input acoustic signal comprising at least one speech signal, the input acoustic signal captured by the 3-tuple coprime microphone array and the 3-tuple coprime microphone array comprising three microphone subarrays;
        the subarray signal processing module further configured to determine a point by point product of the three subarray data sets; and
        the subarray signal processing module further configured to determine a cube root of the point by point product to yield an acoustic signal output data, the acoustic signal output data having an output amplitude and an output phase corresponding to an input amplitude and an input phase of a selected speech signal of the at least one speech signal.

15. The system of claim 14, wherein the subarray signal processing module is configured to select a selected listening direction, the selected listening direction corresponding to the selected speech signal, the input acoustic signal comprising a plurality of speech signals, a respective source of each speech signal positioned at a respective listening direction.

16. The system of claim 14, wherein the subarray signal processing module is configured to generate the respective subarray data sets using point by point summation.

17. The system of claim 14, wherein the computing device further comprises a sound source separation module configured to recover the selected speech signal.

18. The system of claim 14, further comprising beam steering the 3-tuple coprime microphone array to a listening direction associated with the selected speech signal.

19. The system of claim 18, wherein the beam steering comprises adjusting an orientation of the 3-tuple coprime microphone array.

20. The system of claim 18, wherein the beam steering comprises performing a delay and sum operation.

\* \* \* \* \*